March 10, 1959  A. W. THACKERAY  2,876,636
UNIVERSAL JOINTS
Filed Sept. 12, 1956  2 Sheets-Sheet 1

Inventor
ASQUITH W. THACKERAY
By

March 10, 1959  A. W. THACKERAY  2,876,636
UNIVERSAL JOINTS

Filed Sept. 12, 1956  2 Sheets-Sheet 2

Inventor
Asquith W. Thackeray
By

United States Patent Office 2,876,636
Patented Mar. 10, 1959

2,876,636
UNIVERSAL JOINTS

Asquith W. Thackeray, Ipswich, England

Application September 12, 1956, Serial No. 609,449

Claims priority, application Great Britain
December 20, 1955

10 Claims. (Cl. 64—17)

This invention relates to universal joints through which a rotary drive is imparted from a rotatable driving member to a rotatable driven member coupled by the joint and which are disposed with their axes of rotation at an angle to each other, and which may be moved with respect to each other so as to vary, within limits, the angle the axis of one member subtends to the axis of the other.

In known universal joints of this kind, such for example as Hook's joints, there are four positions in each complete revolution of the rotatable members where the swivel action between the two rotatable members is limited, these positions being where the direction of swivel movement is reversed and the limitation being due to the interference of those parts of the rotatable members which carry the coupling elements of the joint. Further, this limited universal action results in vibration of the rotatable and coupling members with a consequent loss of efficiency and a high degree of wear of the members at their points of operative interconnection.

The main object of the present invention is to provide an improved construction of universal joint coupling member for coupling together two rotatable members with their axes of rotation angularly disposed one with respect to the other, which, within limits of variation of the angle between the axes of rotation, will ensure rotation of the members with a smooth swivel action at all times and will preferably ensure that the bearing surfaces of the joint where relative movement between two parts occurs, do not become contaminated with extraneous matter, such as dust, thus providing increased efficiency in the drive imparted through the joint from one rotary member to the other while wear on the bearing surfaces will be reduced to a minimum.

According to the invention, a universal joint coupling member comprises two pairs of spaced co-axial bearing members, each pair being disposed at right angles to the other pair, with the outer end of each bearing member integral with or shaped to be connected to one of the rotatable members, and a bearing surface on each bearing member of each pair tapered towards the other bearing member of the same pair and disposed in rolling contact with the tapered surfaces of two bearing members of the other pair of bearing members.

The invention also comprehends a coupling member comprising two pairs of coaxial spaced bearing members, each pair being disposed at right angles to the other pair, and having its outer end integral with or shaped to be rotatably connected to one of the rotating members while the inner end of each bearing member has a concave bearing surface, and a ball in sliding engagement with and in use retained by the concave bearing surfaces of the bearing members.

Preferably the concave surfaces on the inner ends of the bearing members are of frusto-spherical contour of substantially the same radius as the ball.

Preferably the bearing members have conical side surfaces between their ends such that the conical side surfaces of each bearing member are in rolling engagement with the conical side surfaces of the members on both sides thereof. The conical side surfaces of all the bearing members are preferably at 45° to their axes of rotation, the extension of the conical surfaces of all the bearing members intersecting at the centre of the ball and at the common intersection of the axes of rotation of all the bearing members. Thus the bearing members engage over a substantial surface of the ball to enhance smooth operation of the joint and to reduce wear of the sliding parts.

A cover is provided encasing the bearing surfaces of the bearing members and of the ball so that said bearing surfaces are kept free of extraneous matter or dirt which might cause wear of the bearing surfaces.

The cover is preferably in the form of a hollow globe having in its wall four openings disposed in two pairs of diametrically opposed pairs of openings at right angles to each other whereby the edges of the holes may engage round the bearing members or other parts of the universal joint. Preferably the walls of the globe at the edges of the apertures are each provided with a cavity to receive a lubricant which ensures a seal round the junctions of the hollow globe with the bearing surfaces of the bearing members. The cover is preferably in the form of two hemispheres joined round their circumferences.

The invention further comprehends a universal joint comprising in combination two members capable of being rotated with their axis angularly disposed to one another, a pair of spaced arms at the end of each of said rotatable members, a recess in each of said arms disposed so that said recesses in the arms of each said rotating member are coaxial, two pairs of spaced coaxial bearing members disposed with the common axis of the bearing members of each of said pairs substantially at right angles to the common axis of the bearing members of the other of said pairs, each said bearing member being connected to a member disposed in said recess in one of said arms, to rotate with respect to said arm, a concave bearing surface on the inner end of each said bearing members. A ball is preferably disposed in slidable engagement with and in use retained by the concave bearing surfaces of the bearing members.

In order that the invention may be more clearly understood several preferred embodiments thereof will now be described by way of example with reference to the accompanying drawings in which.

In the drawings the same references have been employed to designate the same parts.

Figures 1, 2:
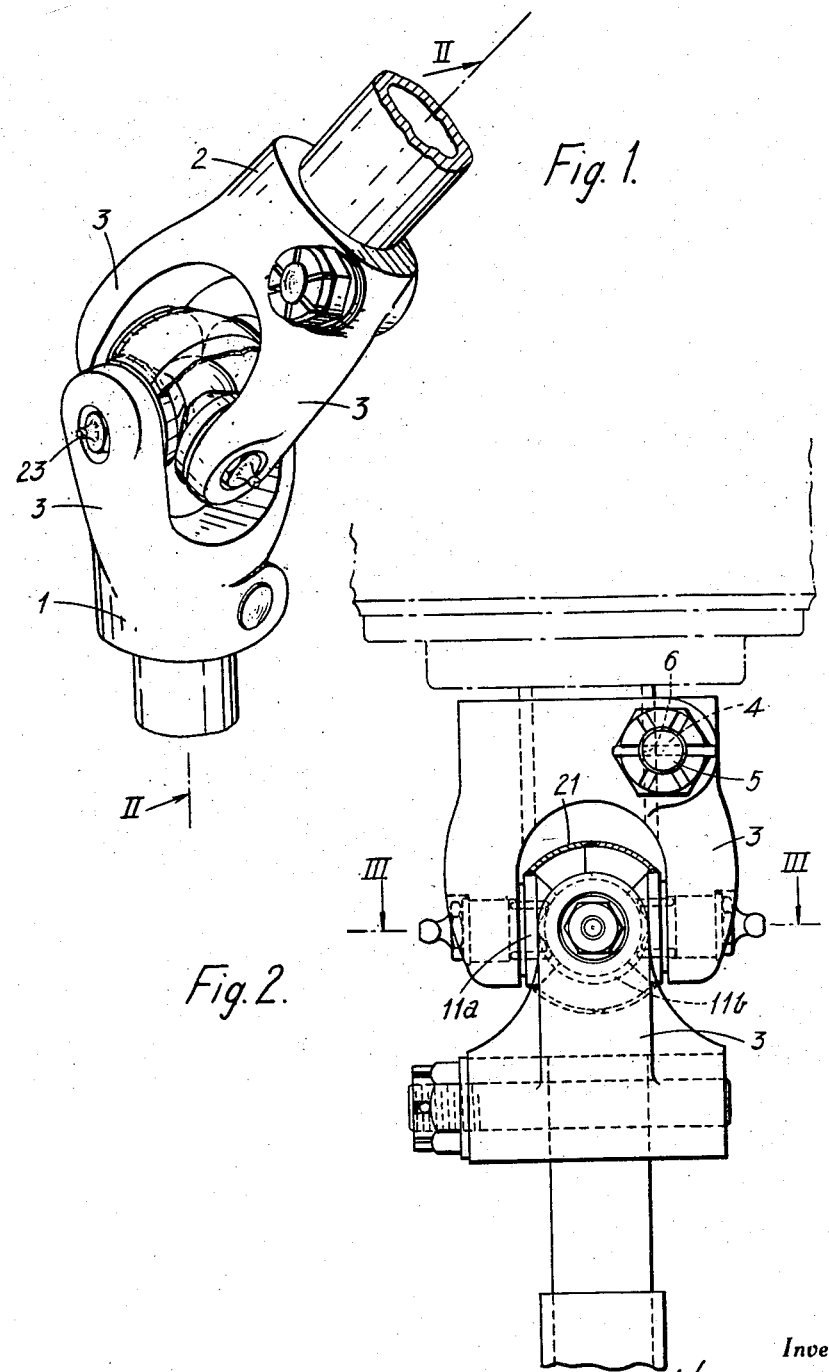
Figure 1 is a perspective view of a universal joint showing a cover over the bearing members of the joint, the cover being partly cut away.
Figure 2 is a cross-section of the joint shown in Figure 1 taken along the line II—II of Figure 1 looking in the direction of the arrows.

Referring to Fig. 1 the joint is provided for joining two rotatable members 1, 2 each of which has a bifurcated end forming arm 3 of the member 1 being at right angles to those of the member 2 when the members 1 and 2 are in axial alignment. The members 1 and 2 are provided with internal cavities 4 (Figure 2) into which are secured shafts, as by a pin 5, engaging in a gap 6 in the shaft member in order that a rotary drive may be imparted from one shaft to the other through the rotatable members 1, 2 and through the joint between these members to be described. The members 1, 2 may however be connected in any other suitable manner, as by a coupling plate, to any rotatable members between which the drive is imparted by the coupling member but as such methods of connection are well known in the art and form no part of the present invention they require no further explanation herein.

Rotatably mounted on the inside of each arm 3 of both members 1 and 2 is a bearing (Fig. 3) having a swivel member 7 secured by a ring 8 into a boring 9 in an arm 3 and having an inner portion 10 on which a rotatable member 11 is rotatably mounted. Suitable anti-friction devices, such as rollers 12, are provided between the rotatable member 11 and the member 7. The two co-axial bearing members 7 secured to each of the members 3 are diametrically opposed and the innermost ends of the members 11 have conical surfaces 13 disposed at 45° to the axis of rotation of the member 3 so that the extension on all the conical surfaces 13 in the assembled joint meet in a common point i. e. the centre of the ball 14. The portions 10 of all the bearing members have on their inner ends concave surfaces 15 and the ball 14 is freely located between the four bearing members in sliding engagement with these concave surfaces. The surfaces 15 are preferably of a curvature of the same radius as the curvature to the surface of the ball and the ball and bearing members are all of such relative size that, in the assembled joint, with the members 11 on the bearing members 7 having their conical surfaces 13 in rolling engagement, the bearing surfaces 15 of all the bearing members will engage the surface of the ball.

It will be seen that, when the joint is assembled, the two members 1, 2 will be prevented from parting by the ball being located in the opposing concave inner end surfaces in the bearing members.

It will be understood that in use, where such universal joints are often open to the ambient air and thus exposed to dust and other extraneous matter in the ambient air in contact therewith, they become very dirty with a result that, although they may not clog, considerable wear of the sliding parts must be expected.

Figure 3:
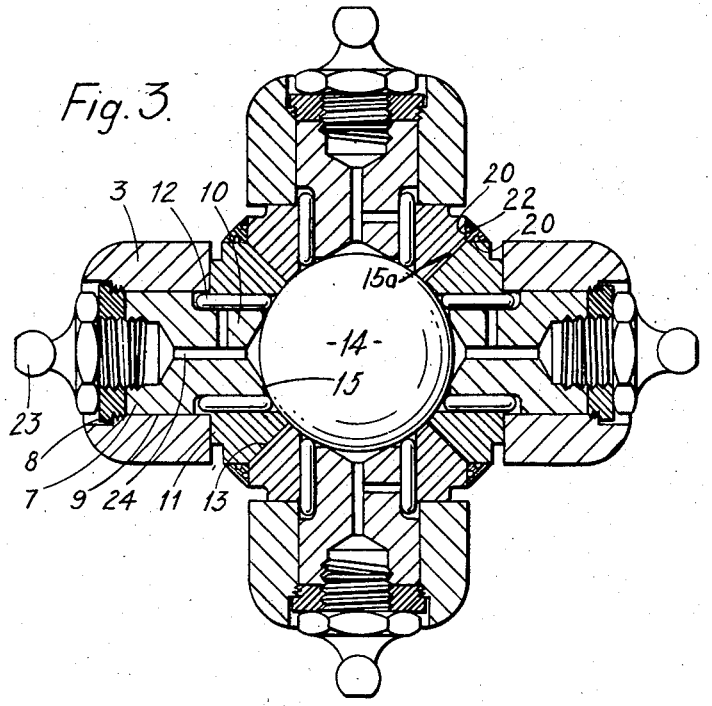
Figure 3 is a view from the line III—III of Figure 2 looking in the direction of the arrows, but showing, in cross-section, a different globe cover from that shown in Figures 1 and 2.

Referring to Fig. 2 each of the bearing members 11a, 11b has an annular seating 20 and a hollow casing 21 is provided in the form of a unitary hollow globe-like construction consisting of two hemispheres formed round the circumference by overlapping rabbeted edges, the casing having opposed apertures in its wall of a radius equal to the inner curvature of the seating 20 in the bearing members whereby the edges of the apertures in the casing can be located on the seating. The inside surfaces of the apertures in the hollow casing are each provided with a cavity 22 (Fig. 3) which may contain a sealing device such as a felt ring, the inner edge of which is in sliding engagement with the seating 20, thus forming a fluid-tight or at least dirt proof joint between the hollow casing and the bearing members. In order to reduce the friction losses between the ball 14 and the members 11 to a minimum suitable means may be provided for lubricating the bearing ball and grease nipples 23 are shown in Fig. 3 on the outer end of the bearing surface for this purpose, the nipples having non-return spring loaded valves, of such well known construction as not to require further description here, communicating with passages 24 in the bearing members leading to the base of each cavity formed by surfaces 15 of the bearing members with which the ball 14 engages. The hollow casing 21 being connected to the bearing members through substantially liquid-tight joints, thus ensures that, in addition to no dirt entering between the bearing surfaces, substantially no lubricant, such as grease, surrounding the ball 14 will escape therefrom and thus attract dirt around the joint. Indeed the seal between the hollow casing and the bearing members makes it possible for the casing to be filled with grease which will maintain the joint in use for a considerable life without undue wear.

Figure 4:
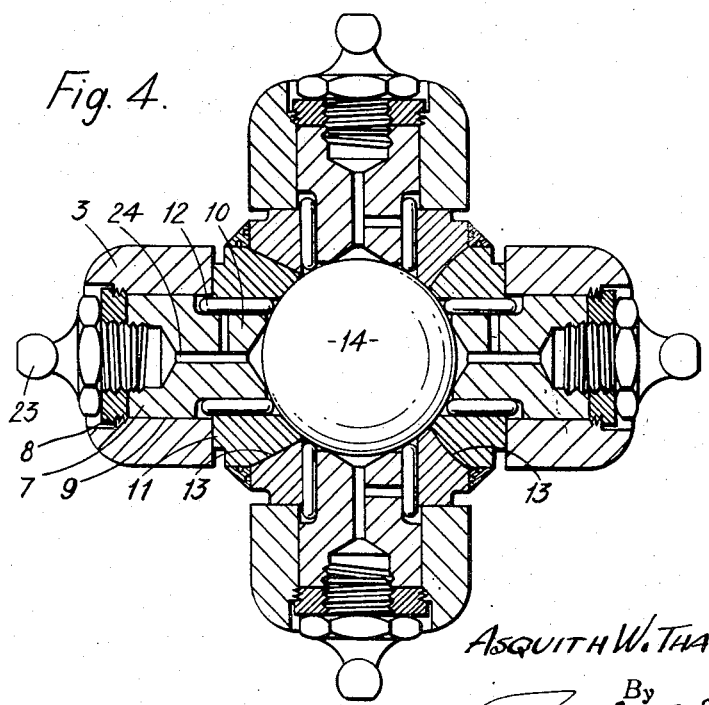
Figure 4 shows two modified constructions of bearing members.

In the modification shown in the left hand side of Figure 4 the conical bearing surfaces 13 are at angles other than 45° to the axis of rotation of the bearing members and indeed any angles may be selected providing the angles of any two bearing members in rolling engagement with each other together make an angle of 90°. Alternatively, as shown in the right hand side of Figure 4 the conical surfaces 13 are of any other contour such as concave or convex (as in Figure 4) providing these bearing surfaces are such that they make rolling contact with the bearing surfaces of the two bearing members at right angles thereto.

The surfaces 13 of the bearing members may be of minimum width, the joint being held together solely by the ball and the arms 3.

Where the lubricating boring 24 and the cavity 15a in the bearing surface is provided in any of the bearing members, the lubricant preferably employed in a gelatinous graphite grease or lubricant gel which will not flow but will slide on to the ball through the cavity 15a as the joint is rotated in operation.

The members 11 may be mounted on the members 7 in sliding contact therewith but the rollers 12 are preferably employed although it will be understood that ball or other anti-friction bearings may be employed. Further ball, roller or other anti-friction bearings may also be employed between the member 7 and the borings in the arms 3.

Thus when the universal ball joint rotates by the driving shaft 1 being rotated, the members 1, 2, although constrained to pivot about the common point at the centre of the ball, are to swivel, one with respect to the other, up to 45° between the longitudinal axes of the two shafts by virtue of the rolling connection of the conical surfaces 13. Further the sliding connection between the ball and the members 11 results in the reduction of the force tending to limit the swivel action of the joint so that the operation of the joint at whatever angle within the defined limits the members 1, 2 are disposed, will be smooth and vibrationless, thus providing a smooth working, simple and efficient joint with a minimum of wear between the sliding parts.

I claim:

1. A universal joint comprising in combination two members capable of being rotated with their axis angularly disposed to one another, a pair of spaced arms at the end of each of said rotatable members, coaxial recesses in the arms of each of said rotatable members disposed with the axis through said recesses in the arms of one of said rotating members at right angles to the axis through the recesses in the arms of the other rotating member, two pairs of spaced coaxial bearing members disposed with the common axis of the bearing members of each of said pairs substantially at right angles to the common axis of the bearing members of the other of said pairs, each said bearing member being connected to a member disposed in said recess in one of said arms, to rotate with respect to said arm, a tapered generally conical bearing surface carried by each of said bearing members, each of said tapered surfaces being tapered towards the tapered surface carried by the other bearing member of said pair and in rolling contact with the tapered surfaces carried by the two bearing members of the other pair, a concave generally frustro-spherical bearing surface on the inner end of each of said bearing members, and a ball disposed in slidable engagement with and in use retained by said concave bearing surfaces of said bearing members.

2. A universal joint according to claim 1 characterised in that each said bearing member is rotatably mounted on one of said members disposed in one of said recesses.

3. A universal joint according to claim 1 characterised in that a globular cover is provided having four apertures therein disposed so that one of said bearing members passes through each of said apertures, a lubricating cavity being provided in the wall of said cover and opening into said aperture so as to provide an anti-friction connection between said cover and said bearing members.

4. A universal joint coupling member for coupling two rotary members, comprising two pairs of co-axial spaced bearing members, each of said pairs being disposed on an axis at right angles to the axis of the other of said pairs, members on the outer ends of said bearing members by which the bearing members of each of said pairs are freely rotatably mounted between the arms of one of said rotating members, a bearing surface carried by each of said bearing members generally reduced in diameter, the reducing diameter of each of said bearing surfaces being reduced towards the other bearing surfaces of said pair and complementary to the reducing diameters of the bearing surfaces of the other pair with each bearing member of one pair having the bearing surface carried thereby in rolling contact with the bearing surfaces carried by the two bearing members of the other pair, a concave bearing surface at the inner end of each bearing member, and a ball disposed in slidable engagement with and retained in use by said concave bearing surfaces of said bearing members.

5. A universal joint coupling member according to claim 4 characterised in that said bearing surfaces of generally reducing diameter are frustro-conical in contour.

6. A universal joint according to claim 4 characterised in that a cover of globular shape is provided encasing said bearing surfaces carried by said bearing member and of said ball, the cover being formed of two hemispheres joined round their circumferences, the globe having four apertures therein disposed so that one of said bearing members passes through each of said apertures and at least one lubricating cavity is provided in the wall of the globe opening into at least one of the apertures respectively to provide an anti-friction connection between the cover and at least one of the bearing members.

7. A universal joint comprising in combination two rotatable members capable of being rotated with their axes angularly disposed, a pair of spaced parallel arms at the end of each rotatable member, the arms of one member overlapping and at right angles to the arms of the other member, a rotatable bearing member mounted on each arm, a frustro-conical bearing surface carried by each bearing member inclined at 45° to the axis of rotation of each bearing member in rolling contact with the bearing surface carried by each of the bearing members on the other pair of arms, the imaginary apices of all the bearing surfaces being disposed on the axes of rotation of all the bearing members and of the said two rotatable members, a frustro-spherical bearing surface on the inner end of each bearing member, and a ball slidably engaging the frustro-spherical bearing surfaces of all the bearing members with its centre at said imaginary apices.

8. A universal joint according to claim 7 characterised in that a cover of globular shape is provided encasing said bearing surfaces on and carried by said bearing member and said ball, the cover being formed of two hemispheres joined round their circumferences, the globe having four apertures therein disposed so that one of said bearing members passes through each of said apertures and at least one lubricating cavity is provided in the wall of the globe opening into at least one of the apertures respectively to provide an anti-friction connection between the cover and at least one of the bearing members.

9. A universal joint coupling member according to claim 1 characterized in that the bearing surface carried by each bearing member is formed on a member freely rotatable on and coaxial with the bearing member.

10. A universal joint according to claim 4 characterized in that the bearing surface carried by each bearing member is formed on a member freely rotatable on and coaxial with the bearing member.

References Cited in the file of this patent
UNITED STATES PATENTS

| Number | Name | Date |
|---|---|---|
| 1,834,906 | Smith et al. | Dec. 1, 1931 |
| 2,057,736 | Parville | Oct. 20, 1936 |
| 2,079,622 | La Rose | May 11, 1937 |
| 2,207,981 | Greinek | July 16, 1940 |
| 2,370,023 | Dunn | Feb. 20, 1945 |
| 2,709,902 | Wildhaber | June 7, 1955 |